US008036451B2

(12) United States Patent  
Redert et al.

(10) Patent No.: US 8,036,451 B2  
(45) Date of Patent: Oct. 11, 2011

(54) CREATING A DEPTH MAP

(75) Inventors: Peter-Andre Redert, Eindhoven (NL); Fabian Edgar Ernst, Eindhoven (NL)

(73) Assignee: Koninklijke Philips Electronics N.V. (NL)

( * ) Notice: Subject to any disclaimer, the term of this patent is extended or adjusted under 35 U.S.C. 154(b) by 397 days.

(21) Appl. No.: 10/597,976

(22) PCT Filed: Feb. 7, 2005

(86) PCT No.: PCT/IB2005/050482  
§ 371 (c)(1), (2), (4) Date: Aug. 15, 2006

(87) PCT Pub. No.: WO2005/083631  
PCT Pub. Date: Sep. 9, 2005

(65) Prior Publication Data  
US 2007/0146232 A1 Jun. 28, 2007

(30) Foreign Application Priority Data

Feb. 17, 2004 (EP) .................................. 04100625

(51) Int. Cl.  
*G06K 9/00* (2006.01)  
*G06K 9/36* (2006.01)  
*G06K 9/46* (2006.01)  
(52) U.S. Cl. ......... 382/154; 382/153; 382/232; 382/285  
(58) Field of Classification Search .............. 382/157, 382/285, 232, 154; 345/56  
See application file for complete search history.

(56) References Cited

U.S. PATENT DOCUMENTS

2002/0154116 A1* 10/2002 Nakatsuka et al. ........... 345/426  
2004/0062439 A1* 4/2004 Cahill et al. .................. 382/173

FOREIGN PATENT DOCUMENTS

WO    WO 02095680 A1 * 11/2002  
WO    WO2004/066212   * 8/2004

OTHER PUBLICATIONS

Q. Zheng, R. Chellappa; Estimation of Illuminant Direction, Albedo, and Shape from Shading; IEEE Transactions of Pattern Analysis and Machine Intelligence, vol. 13, Jul. 1991.*  
Z. Wu, L. Li; A Line-Integration Based Method for Depth Recovery from Surface Normals; IEEE, Nov. 1988.*  
Conservative Vector Fields and Independence of Path, http://www.Itcconline.net/greenl/courses/202/vectorIntegration/FTLI.htm, Feb. 2001.*

(Continued)

*Primary Examiner* — Kee M Tung  
*Assistant Examiner* — Carlos Perromat

(57) ABSTRACT

A method of generating a depth map (122) comprising depth values representing distances to a viewer, for respective pixels of an image (100), is disclosed. The method comprises: computing a cost value for a first one of the pixels (108) of the image by combining differences between values of pixels which are disposed on a path (112) from the first one of the pixels (108) to a second one of the pixels (110) which belongs to a predetermined subset of the pixels of the image; and assigning a first one of the depth values corresponding to the first one of the pixels (108) on basis of the cost value.

11 Claims, 5 Drawing Sheets

OTHER PUBLICATIONS

Figure 1:
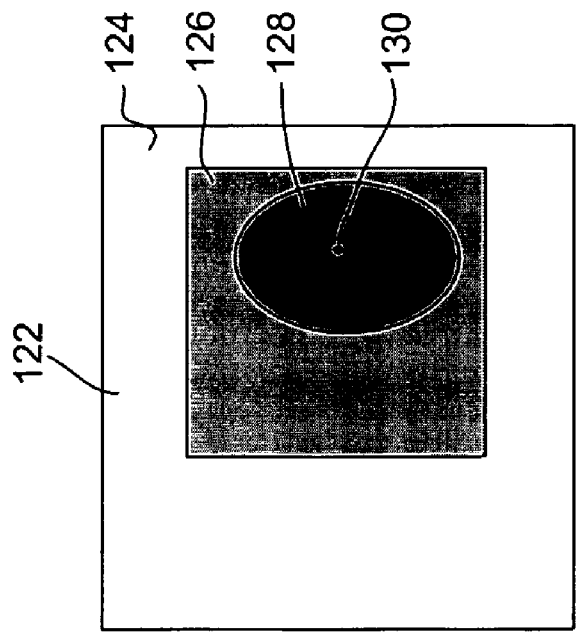
Figure 1:
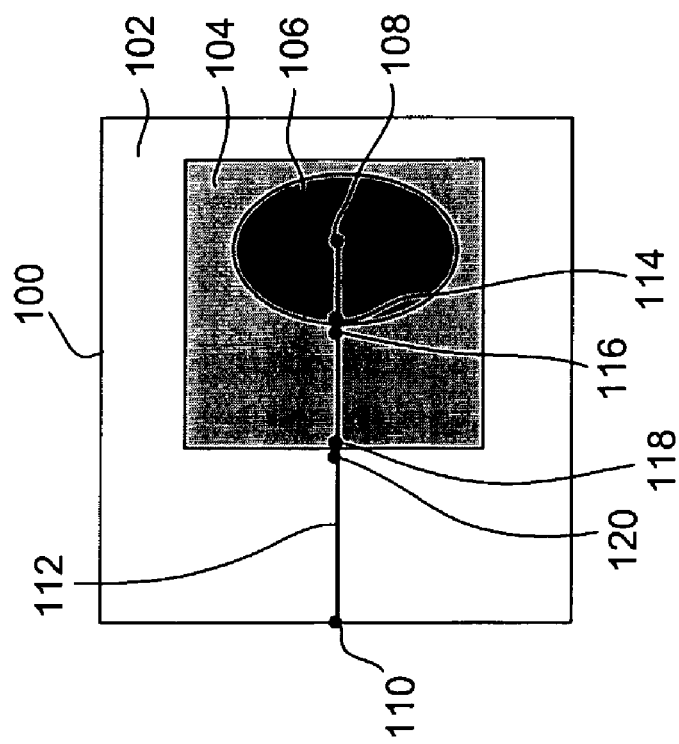

Redert et al: "Synthesis of Mult Viewpoint Images At Non-Intermediate Positions"; Proceedings of International Conference on Acoustics, Speech and Signal Processing, vol. 1V, ISBN 0-8186-7919-0, pp. 2749-2752, IEEE Computer Society, Los Alamitos, CA, 1997.

Berretty et al: "High-Quality Images From 2.5D Video"; Proceedings Eurographics, Granada, 2003, Short Note 124.

Numagami et al: "Reconstruction of the 3-D Shape of an Object From a 2-D Intensity Image"; Electricial and Computer Engineering, 1995. Canadian Conference, Montreal, Quebec Canada, Sep. 5-8, 1995, New York, NY, IEEE,US, vol. 2, pp. 1188-1191, XP010193836.

Tandri et al: "Comparison of Two Shape From Shading Algorithms"; Pattern Recognition Letters, No. 11, Sep. 1990, pp. 637-642, XP002348099.

Bruckstein A.: On Shape From Shading Computer Vision Graphics and Image Processing, Academic Press, vol. 44, No. 2, Nov. 1, 1988, pp. 139-154, XP000008458.

* cited by examiner

CREATING A DEPTH MAP

The invention relates to a method of generating a depth map comprising depth values representing distances to a viewer, for respective pixels of an image.

The invention further relates to a depth map generating unit for generating a depth map comprising depth values representing distances to a viewer, for respective pixels of an image.

The invention further relates to an image processing apparatus comprising:
  receiving means for receiving a signal corresponding to an image; and
  such a depth map generating unit for generating a depth map.

The invention further relates to a computer program product to be loaded by a computer arrangement, comprising instructions to generate a depth map comprising depth values representing distances to a viewer, for respective pixels of an image, the computer arrangement comprising processing means and a memory.

In order to generate a 3D impression on a multi-view display device, images from different virtual view points have to be rendered. This requires either multiple input views or some 3D or depth information to be present. This depth information can be recorded, generated from multiview camera systems or generated from conventional 2D video material. For generating depth information from 2D video several types of depth cues can be applied: such as structure from motion, focus information, geometric shapes and dynamic occlusion. The aim is to generate a dense depth map, i.e. per pixel a depth value. This depth map is subsequently used in rendering a multi-view image to give the viewer a depth impression. In the article "Synthesis of multi viewpoint images at non-intermediate positions" by P. A. Redert, E. A. Hendriks, and J. Biemond, in Proceedings of International Conference on Acoustics, Speech, and Signal Processing, Vol. IV, ISBN 0-8186-7919-0, pages 2749-2752, IEEE Computer Society, Los Alamitos, Calif., 1997 a method of extracting depth information and of rendering a multi-view image on basis of the input image and the depth map are disclosed.

It is an object of the invention to provide a method of the kind described in the opening paragraph, which is based on a new depth cue.

This object of the invention is achieved in that the method comprises:
  computing a cost value for a first one of the pixels of the image by combining differences between values of pixels which are disposed on a path from the first one of the pixels to a second one of the pixels which belongs to a predetermined subset of the pixels of the image; and
  assigning a first one of the depth values corresponding to the first one of the pixels on basis of the cost value.

The invention is based on the following observation. Objects in a scene to be imaged have different sizes, luminances, and colors and have a certain spatial disposition. Some of the objects occlude other objects in the image. Differences between luminance and/or color values of pixels in an image are primarily related to the differences between optical characteristics of the surfaces of the objects and related to the spatial positions of objects relative to light sources within the scene. Optical characteristics of surfaces comprise e.g. color and reflectiveness. Hence, a relatively large transition in luminance and/or color, i.e. a relatively big difference between pixel values of neighboring pixels corresponds to a transition between a first image segment and a second image segment, whereby the first image segment corresponds to a first object and the second image segment corresponds to a second object in the scene being imaged. By determining for the pixels of the image the number of and extend of transitions in luminance and/or color, i.e. differences between pixel values on a path from the respective pixels to a predetermined location of the image, respective measures related to the spatial disposition of the objects in the scene can be achieved. These measures, i.e. cost values are subsequently translated into depth values. This translation is preferably a multiplication of the cost value with a predetermined constant. Alternatively, this translation corresponds to a mapping of the respective cost values to a predetermined range of depth values by means of normalization.

It should be noted that the background also forms one or more objects, e.g. the sky or a forest or a meadow.

The depth value which is based on the luminance and/or color transients can be directly used as depth value for rendering a multi-view image, e.g. as described in the cited article. Preferably, the depth value according to the invention is combined with other depth values, which are based on alternative depth cues as mentioned above.

In an embodiment of the method according to the invention, a first one of the differences is equal to a difference between respective values of neighboring pixels, which are disposed on the path. Computing a difference between two adjacent pixels is relatively easy. Alternatively, a difference is based on more than two pixel values. In a further alternative, a difference is computed between two pixels which are both on the path but which are not adjacent, e.g. the difference is computed between a minimum and a maximum pixel value whereby the minimum and maximum pixel value corresponds to respective pixels which are located within a predetermined distance. Preferably, an absolute difference between respective values of pixels, which are disposed on the path, is computed.

In an embodiment of the method according to the invention, the cost value for the first one of the pixels is computed by accumulating the differences between the values of the pixels, which are disposed on the path. Accumulation, i.e. integration, summation or addition of differences is relatively easy to implement. Preferably, only the differences which are larger than a predetermined threshold are combined by means of accumulation. An advantage of applying a threshold is that the depth value determination is less sensitive to noise within the image.

In another embodiment of the method according to the invention, the cost value for the first one of pixels is computed by accumulating products of differences between the values of the pixels, which are disposed on the path, and respective weighting factors for the differences. By applying weighting factors, it is possible to control the contributions of pixel value differences for the computation of depth values corresponding to the respective pixels. For example, a first one of the weighting factors, which is related to a difference between a value of a particular pixel and a value of its neighboring pixel, is based on a distance between the particular pixel and the first one of the pixels. The first one of the weighting factors is typically relatively low if the distance between the particular pixel and the first one of the pixels is relatively high. For example, a second one of the weighting factors, which is related to a difference between a value of a particular pixel and a value of its neighboring pixel, is based on the location of the neighboring pixel related to the particular pixel. E.g. the second one of the weighting factors is relatively high if the neighboring pixel is located above the particular pixel and is relatively low if the neighboring pixel is located below the particular pixel. Alternatively, the second one of the weighting factors is related to the angle between a first vector and a second vector, whereby the first vector corresponds to the location of the neighboring pixel related to the particular pixel and the second vector corresponds to the location of the first one of pixels related to the second one of the pixels.

An embodiment according to the invention, further comprises:

computing a second cost value for the first one of the pixels of the image by combining differences between values of pixels which are disposed on a second path from the first one of the pixels to a third one of the pixels which belongs to the predetermined subset of the pixels of the image;

determining the minimum of the cost value and the second cost value;

assigning the first one of the depth values corresponding to the first one of the pixels on basis of the minimum.

In this embodiment according to the invention, the first one of depth values is based on a particular selection of multiple values related to multiple paths, i.e. the optimum path from the first one of the pixels to the second one of the pixels. Notice that the second one of pixels and the third one of the pixels may be mutually equal, i.e. the same. An alternative type of selection or combination of the cost values related to respective paths is advantageous. For instance an average of cost values related to multiple paths can be computed.

Another embodiment of the method according to the invention further comprises computing a second cost value for a third one of the pixels on basis of the cost value for the first one of the pixels. Making reuse of already computed cost values results in a computing efficient implementation. Typically, computing the second cost value is performed by combining the cost value of the first one of the pixels with a difference between further values of further pixels which are disposed on a second path from the third one of the pixels to the first one of the pixels.

In an embodiment of the method according to the invention, whereby cost values corresponding to respective pixels of the image are successively computed on basis of further cost values being computed for further pixels, a first scan direction of successive computations of cost values for a first row of pixels of the image is opposite to a second scan direction of successive computations of cost values for a second row of pixels of the image. Typically for each of the pixels of the image a depth value has to be computed. Preferably, usage is made of cost values already computed for other pixels when computing a particular cost value for a particular pixel. The order in which the successive pixels are processed, i.e. the depth values are computed, is relevant. Preferably, the order is such that the pixels of the image are processed row-by-row or alternatively column-by-column. If the pixels are processed row-by-row then it is advantageous to processes the subsequent rows in reverse order, e.g. the even rows from left to right and the odd rows from right to left or vice versa. The inventors have observed that this zigzag type of processing results in much better results than a processing whereby all rows are processed in the same scan direction. The quality of the depth map created on basis of this zigzag type of processing, is comparable with results from more expensive methods of determining cost values for respective paths. With more expensive is meant that more paths are evaluated in order to determine the optimal path.

It is a further object of the invention to provide a depth map generating unit of the kind described in the opening paragraph, which is based on a new depth cue.

This object of the invention is achieved in that the generating unit comprises:

computing means for computing a cost value for a first one of the pixels of the image by combining differences between values of pixels which are disposed on a path from the first one of the pixels to a second one of the pixels which belongs to a predetermined subset of the pixels of the image; and assigning means for assigning a first one of the depth values corresponding to the first one of the pixels on basis of the cost value.

It is a further object of the invention to provide an image processing apparatus comprising a depth map generating unit of the kind described in the opening paragraph, which is arranged to generate a depth map based on a new depth cue.

This object of the invention is achieved in that the generating unit comprises:

computing means for computing a cost value for a first one of the pixels of the image by combining differences between values of pixels which are disposed on a path from the first one of the pixels to a second one of the pixels which belongs to a predetermined subset of the pixels of the image; and assigning means for assigning a first one of the depth values corresponding to the first one of the pixels on basis of the cost value.

It is a further object of the invention to provide a computer program product of the kind described in the opening paragraph, which is based on a new depth cue.

This object of the invention is achieved in that the computer program product, after being loaded, provides said processing means with the capability to carry out:

computing a cost value for a first one of the pixels of the image by combining differences between values of pixels which are disposed on a path from the first one of the pixels to a second one of the pixels which belongs to a predetermined subset of the pixels of the image; and assigning a first one of the depth values corresponding to the first one of the pixels on basis of the cost value.

Modifications of the depth map generating unit and variations thereof may correspond to modifications and variations thereof of the image processing apparatus, the method and the computer program product, being described.

Figure 3:
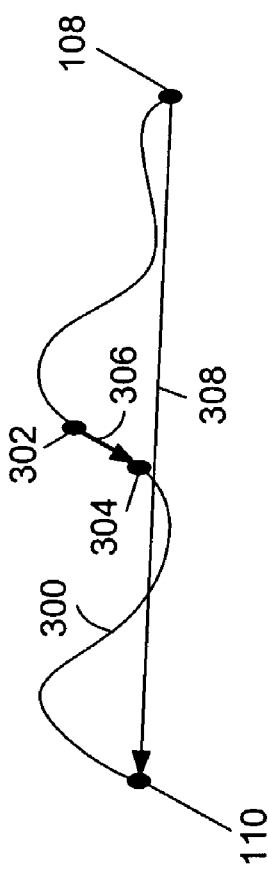
Figure 2:
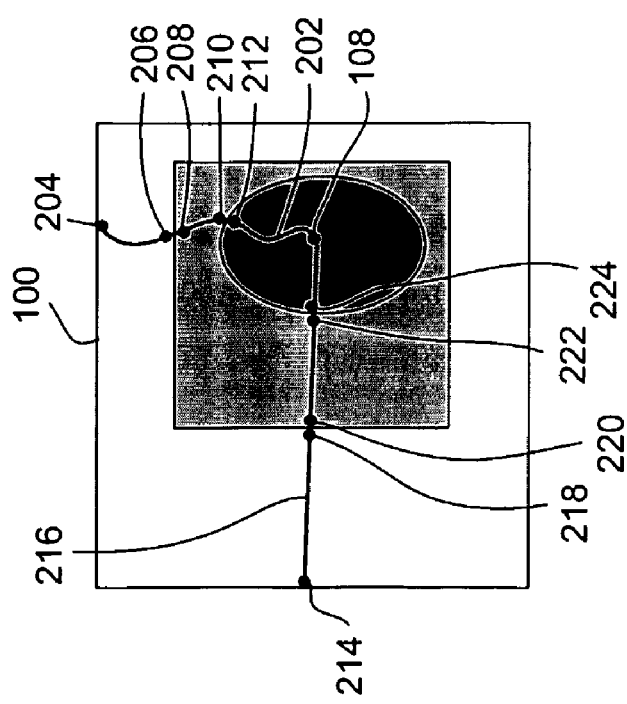
Figure 4:
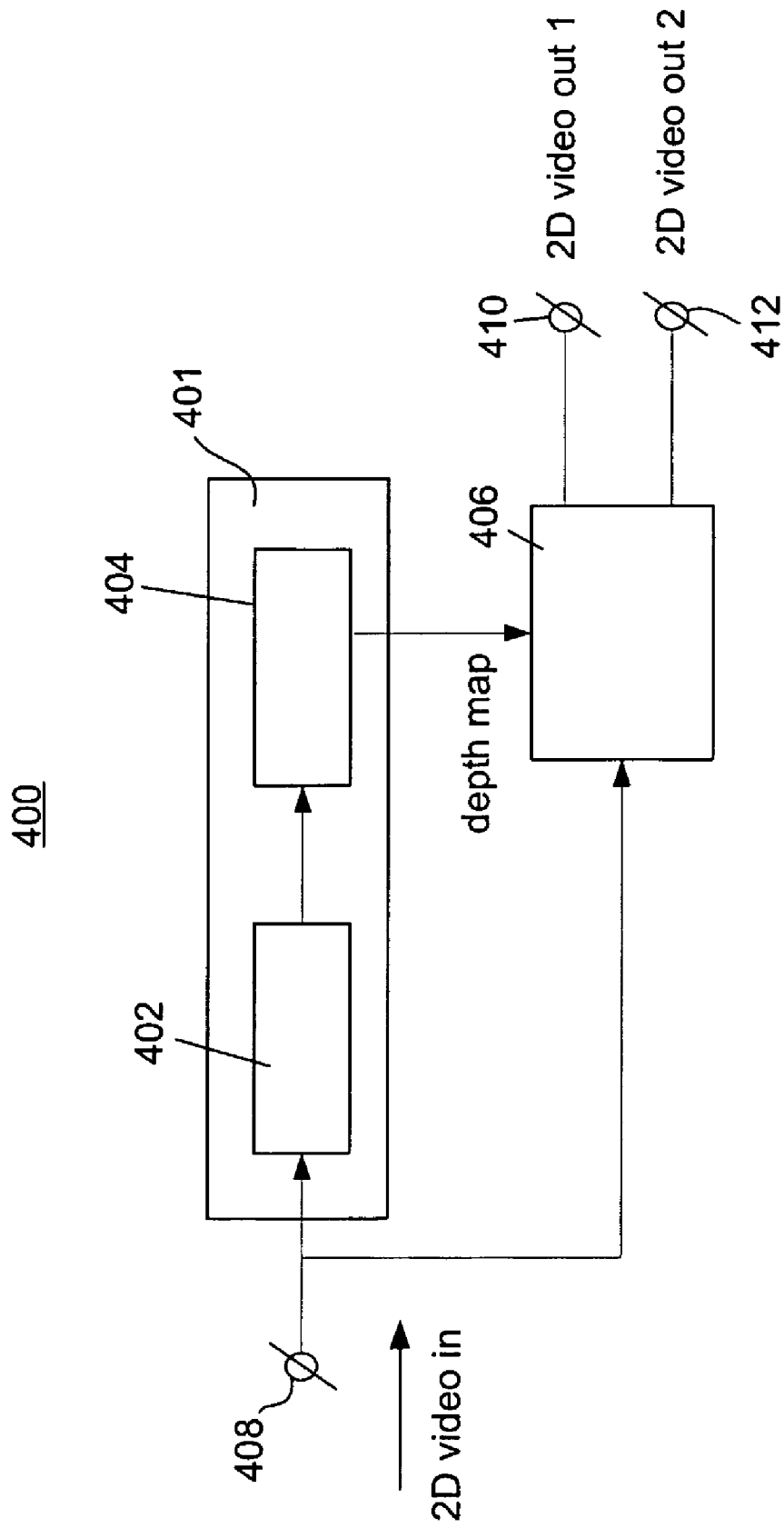
Figure 5:
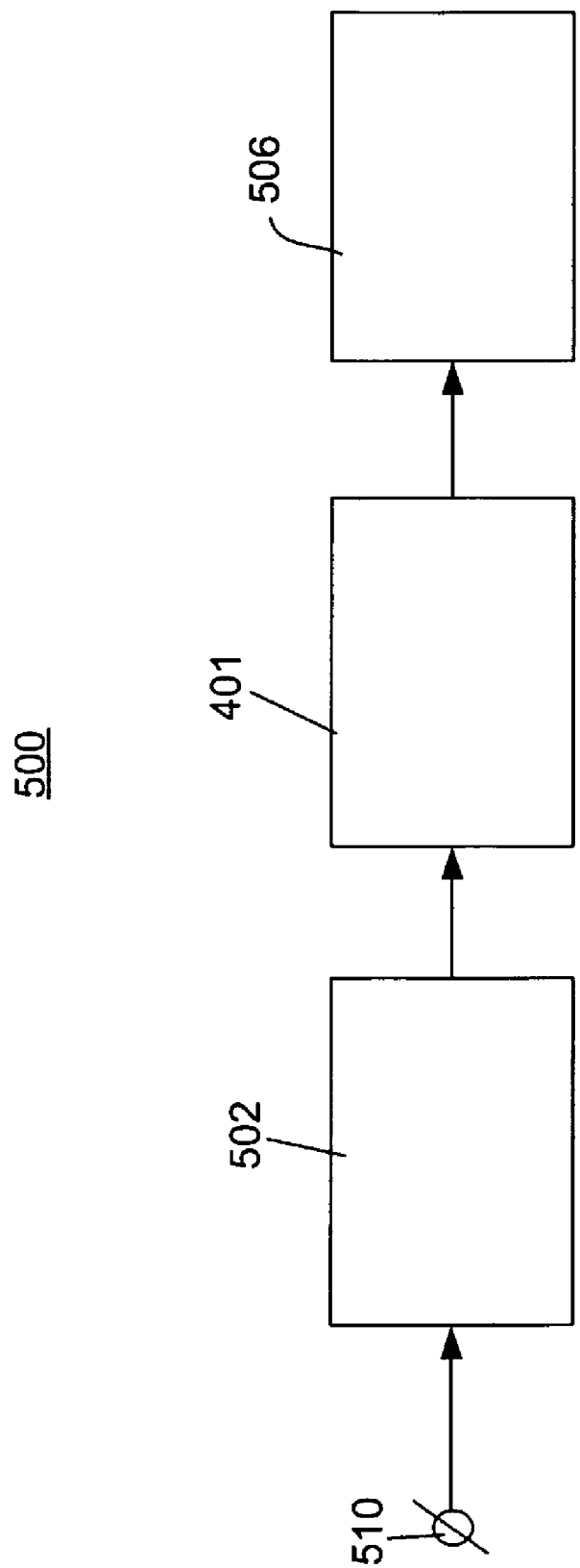
Figure 6:
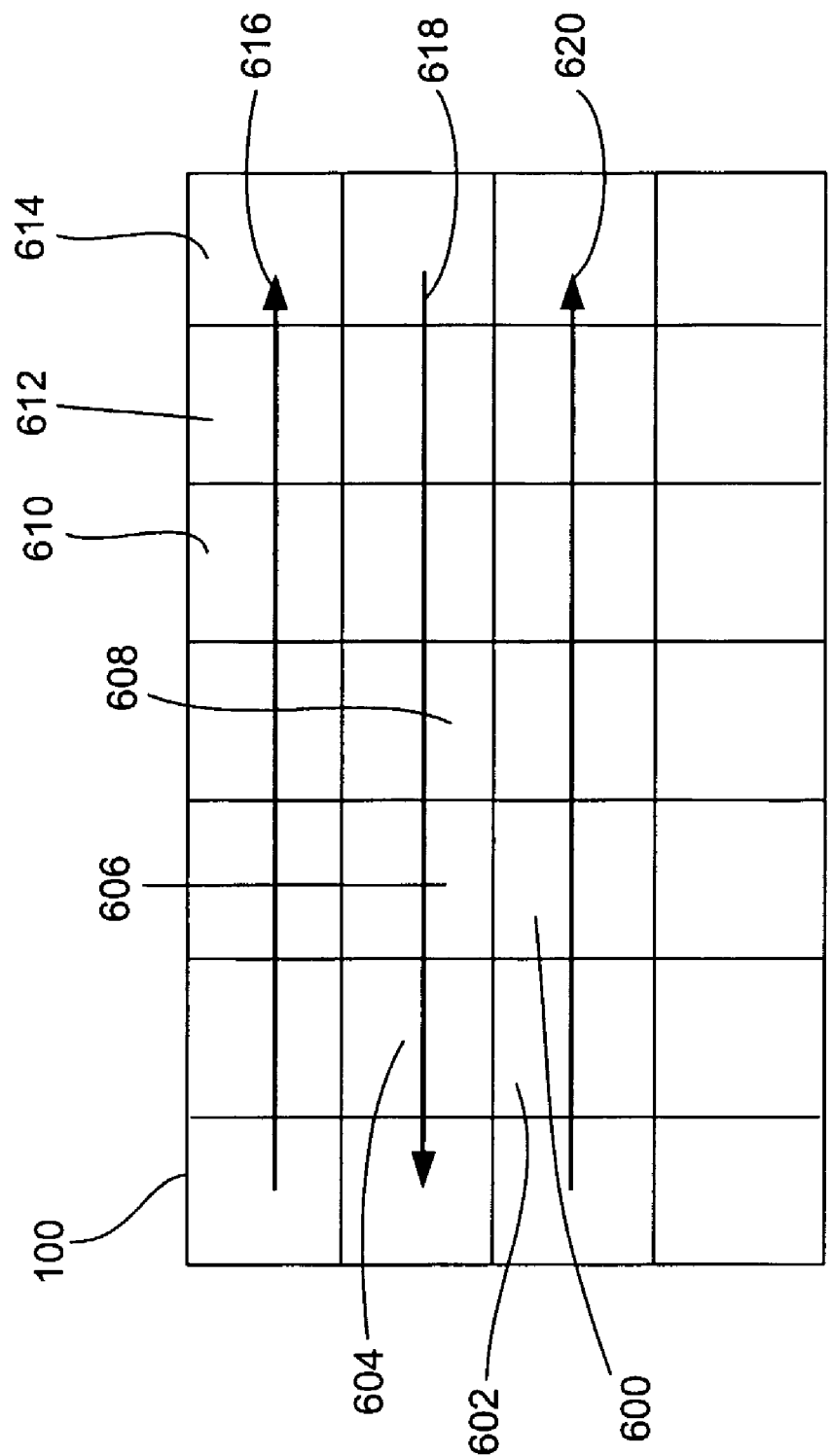

These and other aspects of the depth map generating unit, of the image processing apparatus, of the method and of the computer program product, according to the invention will become apparent from and will be elucidated with respect to the implementations and embodiments described hereinafter and with reference to the accompanying drawings, wherein:

FIG. 1 schematically shows an image and the corresponding depth map being generated with the method according to the invention;

FIG. 2 schematically shows two paths;

FIG. 3 schematically shows a path from a first pixel to a second pixel, a first vector from the first pixel to the second pixel and a second vector from a third pixel to a fourth pixel on the path;

FIG. 4 schematically shows a multi-view image generation unit comprising a depth map generation unit according to the invention;

FIG. 5 schematically shows an embodiment of the image processing apparatus according to the invention; and FIG. 6 schematically shows the sequence of processing respective pixels of the image.

Same reference numerals are used to denote similar parts throughout the Figures.

FIG. 1 schematically shows an image 100 and the corresponding depth map 122 being generated with the method according to the invention. FIG. 1 shows an image 100 representing a first object 106, a second object 104 which is located behind the first object 106 and a third object 102 which is located behind the second object 104. FIG. 1 further shows a path 112 from a first pixel 108 to a second pixel 110. The path 112 corresponds to a group of connected pixels.

In general, a pixel in an image is connected to 8 neighboring pixels, i.e. 2 pixels being horizontally located relative to the pixel, 2 pixels being vertically located relative to the pixel and 4 pixels being diagonally located relative to the pixel. Pairs of pixels of the path 112 are mutually located in one of these 3 ways, i.e. horizontally, vertically or diagonally relative to each other.

In FIG. 1 two pairs of pixels, comprising the pixels with respective reference numbers 114, 116 and 118, 120 are depicted. The first pair of pixels 114, 116 is disposed on the path 112 on a location corresponding to the transition between the first object 106 to the second object 104. The second pair of pixels 118, 120 is disposed on the path 112 on another location corresponding to the transition between the second object 104 and the third object 102.

FIG. 1 also shows a depth map 122. The depth map 122 comprises a first group 128 of depth values corresponding to the first object 106, comprises a second group 126 of depth values corresponding to the second object 104 and comprises a third group 124 of depth values corresponding to the third object 102. The depth values of the first group 128 of depth values are lower than the depth values of the second group 126 of depth values, meaning that the first object 106 is more close to a viewer of the image 100 or of a multi-view image which is based on the image 100, than the second object 104.

The depth map 122 is generated on basis of the method according to the invention. For the generation of the depth value 130 corresponding to the first pixel 108 the following steps are performed:
  a cost value for the first pixel 108 of the image is computed by combining differences between values of pairs of connected pixels 114, 116 and 118, 120, which are disposed on a path 112 from the first pixel 108 to the second pixel 110 which belongs to a predetermined subset of the pixels of the image 100; and
  the depth value 130 corresponding to the first pixel 108 is computed by dividing a constant value by the cost value for the first pixel 108.

The second pixel 110 belongs to a predetermined subset of the pixels of the image 100. In this case the predetermined subset comprises pixels at the border of the image. In alternative embodiments the subset comprises pixels of a part of the border, e.g. only the pixels of the upper border of the image or the lower border of the image. In a further alternative the subset comprises a central pixel of the image.

As explained above, the assigned depth value for the first pixel 108 is related to a cost function for the first pixel 108. The cost function is based on transitions, i.e. the cost value increases when there are more and/or bigger transitions on the path from the first 108 pixel to the second pixel 110. The assigned depth value can be based on one of the following approaches:
  the first pixel is assigned a relatively low depth value if the corresponding cost value is relatively low; or
  the first pixel is assigned a relatively high depth value if the corresponding cost value is relatively high.

To summarize, there is a relation between the cost value and the location of the second pixel 110 and a relation between the assigned depth value and the cost value.

Table 1 shows a number of possible relations between these quantities. In the cases as listed in Table 1, it is assumed that the first pixel 108 is located at the center of image.

TABLE 1

Relations between location, cost value and depth value.

| Location of the second pixel | Cost value of the first pixel | Depth value of the first pixel |
| --- | --- | --- |
| Upper border | High | High |
| Upper border | High | Low |
| Lower border | High | High |
| Lower border | High | Low |
| Left/right border | High | High |
| Left/right border | High | Low |
| Center | Low | High |
| Center | Low | Low |

A relatively low depth value means that the first pixel is relatively close to the viewer of the multi view image being generated on basis of the image and a relatively high depth value means that the first pixel is relatively far removed from the viewer of the multi view image.

Preferably, the computation of the cost value V(x',y') is based on an accumulation of pixel value differences, which are allocated to pixels being located on a path $P_i$ from the first pixel to the second pixel, with i being an index to indicate a particular one of the paths from the pixel with coordinates (x',y').

$$V(x',y')=\Sigma\{E(x,y)|(x,y)\epsilon P_i\} \quad (1)$$

A first example of the computation of a pixel value difference E(x,y) is given in Equation 2:

$$E(x,y)=|I(x,y)-I(x-a,y-b)| \quad (2)$$

with, I(x,y) the luminance value of a pixel with coordinates x and y of the image and $-1 \leq a \leq 1$ and $-1 \leq b \leq 1$.

Alternatively, a pixel value difference E(x,y) is computed on basis of color values:

$$E(x,y)=|C(x,y)-C(x-a,y-b)| \quad (3)$$

with, C(x,y) a color value of a pixel with coordinates x and y of the image. In Equation 4 a further alternative is given for the computation of a pixel value difference E(x,y) based on the three different color components R (Red) G (Green) and B (Blue).

$$E(x,y)=\max(|R(x,y)-R(x-a,y-b)|,|G(x,y)-G(x-a,y-b)|, |B(x,y)-B(x-a,y-b)|) \quad (4)$$

Optionally, the pixel value difference signal $\vec{E}$ is filtered by clipping all pixel value differences, which are below a predetermined threshold, to a constant e.g. zero.

As said, preferably the computation of the cost value V(x', y') is based on an accumulation of pixel value differences being allocated to pixels being located on a path $P_i$ from the first pixel to the second pixel. There are several approaches to select this path $P_i$ from a set of paths.

FIG. 1 schematically shows a path which is based on a simple strategy, i.e. the shortest distance from the first pixel 108 to a pixel of the predetermined set being the pixels which are located at the left border of the image. That means that the first pixel 108 and the second pixel 110 have the same y-coordinate.

FIG. 2 schematically shows alternative paths 216, 202. The first one 216 of these alternative paths corresponds to the shortest distance from the first pixel 108 to a second pixel 214 of the predetermined set being the pixels which are located at the left border of the image. In this case the restriction that the first pixel 108 and the second pixel 214 have mutually equal y-coordinates is not applicable. The second pixel 214 corresponds to the pixel of the left border pixels which can be reached with minimum costs. On the first one 216 of these alternative paths the pixels with the following reference numbers 218-224 are disposed.

FIG. 2 also shows a second one 202 of alternative paths, which corresponds to the path reaching the upper border and having minimum costs. It can be clearly seen that the second one 202 of alternative paths has an irregular shape. On the second one 202 of alternative paths the pixels with the following reference numbers 206-212 are disposed.

Instead of computing the cost value V(x',y') on basis of a single path, the cost value can be based on a combination of paths, e.g. the average cost values may be computed.

A further alternative for computing the cost value V(x',y') is based on weighting factors for the various pixel value differences.

$$V(x',y')=\Sigma\{W(j)E(x,y)|(x,y)\epsilon P_j\} \quad (5)$$

This weighting factor W(j) is preferably related to a spatial distance j between one of the pixels of the pixel pair for which a pixel value difference E(x,y) is being computed and the first pixel. Typically, this weighting factor W(j) is lower for bigger spatial distances.

Alternatively, the weighting factor W(j) is related to an angle between two vectors. FIG. 3 schematically shows a path from a first pixel 108 to a second pixel 110, a first vector 308 from the first pixel 108 to the second pixel 110 and a second vector 306 from a third pixel 302 to a fourth pixel 304 on the path 300. Typically, the weighting factor W(j) is relatively high if the angle between the first vector 308 and the second vector 306 is relatively low, i.e. the orientation of the fourth pixel 304 relative to the third pixel 302 matches with the orientation of the second pixel 110 relative to the first pixel 108. That means that transitions which match with the first vector 308 are considered to be more relevant than transitions which are e.g. perpendicular to the first vector 308.

FIG. 4 schematically shows a multi-view image generation unit 400 comprising a depth map generation unit 401 according to the invention. The multi-view image generation unit 400 is arranged to generate a sequence of multi-view images on basis of a sequence of video images. The multi-view image generation unit 400 is provided with a stream of video images at the input connector 408 and provides two correlated streams of video images at the output connectors 410 and 412, respectively. These two correlated streams of video images are to be provided to a multi-view display device which is arranged to visualize a first series of views on basis of the first one of the correlated streams of video images and to visualize a second series of views on basis of the second one of the correlated streams of video images. If a user, i.e. viewer, observes the first series of views by his left eye and the second series of views by his right eye he notices a 3D impression. It might be that the first one of the correlated streams of video images corresponds to the sequence of video images as received and that the second one of the correlated streams of video images is rendered on basis of the sequence of video images as received. Preferably, both streams of video images are rendered on basis of the sequence of video images image as received. The rendering is e.g. as described in the article "Synthesis of multi viewpoint images at non-intermediate positions" by P. A. Redert, E. A. Hendriks, and J. Biemond, in Proceedings of International Conference on Acoustics, Speech, and Signal Processing, Vol. IV, ISBN 0-8186-7919-0, pages 2749-2752, IEEE Computer Society, Los Alamitos, Calif., 1997. Alternatively, the rendering is as described in "High-quality images from 2.5D video", by R. P. Berretty and F. E. Ernst, in Proceedings Eurographics, Granada, 2003, Short Note 124.

The multi-view image generation unit 400 comprises:
a depth map generation unit 401 for generating depth maps for the respective input images on basis of the transitions in the image; and
a rendering unit 406 for rendering the multi-view images on basis of the input images and the respective depth maps, which are provided by the depth map generation unit 401.

The depth map generating unit 401 for generating depth maps comprising depth values representing distances to a viewer, for respective pixels of the images, comprises:
a cost value computing unit 402 for computing a cost value for a first one of the pixels of the image by combining differences between values of pixels which are disposed on a path from the first one of the pixels to a second one of the pixels which belongs to a predetermined subset of the pixels of the image. The computation of cost values is as described in connection with any of the FIGS. 1, 2 and 3; and
a depth value assigning unit 404 for assigning a first one of the depth values corresponding to the first one of the pixels on basis of the cost value.

The computing unit 402 is arranged to provide a cost value signal $V_F=V(x',y',n)$, with coordinates x' and y' of image at time n, which represents per pixel the cost value.

After the computation of the cost value signal $V_F$ the depth map is determined. This is specified in Equation 6:

$$D(x',y',n)=F(V_F) \quad (6)$$

with D(x',y',n) the depth value of a pixel with coordinates x' and y' of image at time n and the function F(j) being a linear or non-linear transformation of a cost value V(x', y', n), into a depth value D(x', y', n). This function F(j) is preferably a simple multiplication of the cost value V(x',y',n) with a predetermined constant:

$$D(x',y',n)=\alpha \cdot V(x',y',n) \quad (7)$$

It should be noted that for the computation of the cost value for a particular pixel the computed cost value for a neighboring pixel could be applied. In other words, the computation of cost values is preferably performed in a recursive way. See also the description in connection with FIG. 6.

The cost value computing unit 402, the depth value assigning unit 404 and the rendering unit 406 may be implemented using one processor. Normally, these functions are performed under control of a software program product. During execution, normally the software program product is loaded into a memory, like a RAM, and executed from there. The program may be loaded from a background memory, like a ROM, hard disk, or magnetically and/or optical storage, or may be loaded via a network like Internet. Optionally an application specific integrated circuit provides the disclosed functionality.

It should be noted that, although the multi-view image generation unit 400 as described in connection with FIG. 4 is designed to deal with video images, alternative embodiments of the depth map generation unit according to the invention are arranged to generate depth maps on basis of individual images, i.e. still pictures.

FIG. 5 schematically shows an embodiment of the image processing apparatus 500 according to the invention, comprising:
a receiving unit 502 for receiving a video signal representing input images;
a multi-view image generation unit 401 for generating multi-view images on basis of the received input images, as described in connection with FIG. 4; and a multi-view display device 506 for displaying the multi-view images as provided by the multi-view image generation unit 401.

The video signal may be a broadcast signal received via an antenna or cable but may also be a signal from a storage device like a VCR (Video Cassette Recorder) or Digital Versatile Disk (DVD). The signal is provided at the input connector 510. The image processing apparatus 500 might e.g. be a TV. Alternatively the image processing apparatus 500 does not comprise the optional display device but provides the output images to an apparatus that does comprise a display device 506. Then the image processing apparatus 500 might be e.g. a set top box, a satellite-tuner, a VCR player, a DVD player or recorder. Optionally the image processing apparatus 500 comprises storage means, like a hard-disk or means for storage on removable media, e.g. optical disks. The image processing apparatus 500 might also be a system being applied by a film-studio or broadcaster.

FIG. 6 schematically shows the sequence of processing respective pixels 600-614 of the image 100. By means of arrows 616-620 it is indicated in FIG. 6 what the order of pixels being processed is. The first row of the image 100, comprising the pixels with reference numbers 610-614 is processed from the left to the right. The second row of image 100, comprising the pixels with reference numbers 604-608 is processed from the right to the left. The third row of the image 100, comprising the pixels with reference numbers 600-602 is processed from the left to the right again. Hence the subsequent rows of pixels of the image 100 are processed in opposite order.

With processing a particular pixel is meant:
computing a particular cost value for the particular pixel by combining differences between values of pixels which are disposed on a path from the particular pixel to a second pixel which belongs to a predetermined subset of the pixels of the image; and
assigning a particular depth value to the depth map under construction, corresponding to the particular pixel on basis of the computed particular cost value.

Computing the particular cost value is based on already computed cost values for other pixels. The following example is provided to illustrate that. Suppose that the depth values corresponding to pixels 604-614 of the first and second row have already been determined, and hence the respective cost values corresponding to respective paths are known. Besides that a number of pixels 602 of the third row have also been processed. Next the depth value for a particular pixel with reference number 600 has to be determined. Preferably, this is done by evaluating the following set of candidate cost values:

a first candidate cost value which is based on the cost value of the pixel 602 being located left from the particular pixel 600 and a pixel value difference between these two pixels;
a second candidate cost value which is based on the cost value of the pixel 606 being located above the particular pixel 600 and a pixel value difference between these two pixels;
a third candidate cost value which is based on the cost value of the pixel 604 being located left above the particular pixel 600 and a pixel value difference between these two pixels;
a fourth candidate cost value which is based on the cost value of the pixel 608 being located right above the particular pixel 600 and a pixel value difference between these two pixels.

After determining the minimum cost value from the set of candidate cost values the path starting from the particular pixel is known, the corresponding cost value is known and the corresponding depth value can be assigned.

It will be clear that sets of candidate cost values typically depend on the scan direction. For instance in the case of a scan direction from the right to the left, the sets of candidate cost values may comprise a candidate cost value which is based on the cost value of a pixel being located right from the particular pixel under consideration. The sets of candidate cost values may comprise additional cost values. Alternatively, the sets of candidate cost values comprise less cost values.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware. The usage of the words first, second and third, etcetera do not indicate any ordering. These words are to be interpreted as names.

The invention claimed is:

1. A method of generating, from a single view input image, a depth map comprising depth values representing distances to a viewer, for respective pixels of the image, the method comprising:
computing, via a cost value computing device, cost values as depth cues, wherein the cost values comprise respective measures of (i) a number of and (ii) extent of transitions in luminance and/or color and/or color components for pixels of the image on a path related to a spatial disposition of objects in the image, wherein said computing cost values as depth cues includes computing a cost value as a depth cue for a first one of the pixels of the image by (a) accumulating differences between luminance and/or color and/or color component values of (b) pairs of neighboring connected pixels, wherein each pair of neighboring connected pixels is distinct and located at separate transitions, wherein (c) the separate transitions are disposed on (d) the path, wherein the path comprises a group of connected pixels that extends from (e) the first one of the pixels to (f) a second one of the pixels, wherein the second one of the pixels belongs to (g) a predetermined subset of the pixels of the image, wherein the predetermined subset comprises one selected from the group consisting of (g)(i) pixels which are located at a border of the image, (g)(ii) pixels of a part of the border, and (g)(iii) a central pixel of the image, further wherein the cost value for the first one of pixels is computed by (h) accumulating products of (h)(i) differences between the values of the pixels which are disposed on the path and (h)(ii) respective weighting factors for the differences, wherein the weighting factors control contributions of pixel value differences for computation of depth values corresponding to respective pixels, wherein (h)(iii) a first one of the weighting factors which is related to a difference between a value of a particular pixel and a value of its neighboring pixel, is based on a distance between the particular pixel and the first one of the pixels, wherein the first one of the weighting factors is low if the distance between the particular pixel and the first one of the pixels is high and wherein (h)(iv) a second one of the weighting factors which is related to a difference between a value of a particular pixel and a value of its neighboring pixel, is based on the location of the neighboring pixel related to the particular pixel, wherein the second one of the weighting factors is high if the neighboring pixel is located above the particular pixel and is low if the neighboring pixel is located below the particular pixel; and assigning, via a depth value assigning device, a depth value corresponding to the first one of the pixels on basis of the computed cost value.

2. The method as claimed in claim 1, wherein a second one of the differences is equal to an absolute value of difference between respective values of neighboring pixels which are disposed on the path.

3. The method as claimed in claim 1, wherein the values of pixels corresponds to one of luminance and color.

4. The method as claimed in claim 1, wherein the cost value for the first one of the pixels is computed by accumulating the differences between the values of the pixels which are disposed on the path, the differences being larger than a predetermined threshold.

5. The method as claimed in claim 1, wherein said method further comprises:

computing, via the cost value computing device, a second cost value as a depth cue for the first one of the pixels of the image by accumulating differences between luminance and/or color and/or color component values of pixels which are disposed on a second path from the first one of the pixels to a third one of the pixels which belongs to the predetermined subset of the pixels of the image;

determining, via the cost value computing device, the minimum of the cost value and the second cost value;

assigning, via the depth value assigning device, the first one of the depth values corresponding to the first one of the pixels on basis of the minimum.

6. The method as claimed in claim 1, wherein said method further comprises:

computing, via the cost value computing device, a second cost value as a depth cue for a third one of the pixels on basis of the cost value for the first one of the pixels.

7. The method as claimed in claim 6, wherein said step of computing the second cost value comprises combining the cost value of the first one of the pixels with a difference between further values of further pixels which are disposed on a second path from the third one of the pixels to the first one of the pixels.

8. The method as claimed in claim 6, wherein cost values corresponding to respective pixels of the image are successively computed on basis of further cost values being computed for further pixels, a first scan direction of successive computations of cost values for a first row of pixels of the image being opposite to a second scan direction of successive computations of cost values for a second row of pixels of the image.

9. A depth map generating unit for generating, from a single view input image, a depth map comprising depth values representing distances to a viewer, for respective pixels of the image, the generating unit comprising:

computing means for computing cost values as depth cues, wherein the cost values comprise respective measures of (i) a number of and (ii) extent of transitions in luminance and/or color and/or color components for pixels of the image on a path related to a spatial disposition of objects in the image, wherein said computing cost values as depth cues includes computing a cost value as a depth cue for a first one of the pixels of the image by (a) accumulating differences between luminance and/or color and/or color component values of pairs of neighboring connected pixels, wherein each pair of neighboring connected pixels is distinct and located at separate transitions, wherein (c) the separate transitions are disposed on (d) the path; wherein the path comprises a group of connected pixels that extends from (e) the first one of the pixels to (f) a second one of the pixels, wherein the second one of the pixels belongs to (g) a predetermined subset of the pixels of the image, wherein the predetermined subset comprises one selected from the group consisting of (g)(i) pixels which are located at a border of the image, (a)(ii) pixels of a part of the border, and (c)(iii) a central pixel of the image, further wherein the cost value for the first one of pixels is computed by (h) accumulating products of (h)(i) differences between the values of the pixels which are disposed on the path and (h)(ii) respective weighting factors for the differences, wherein the weighting factors control contributions of pixel value differences for computation of depth values corresponding to respective pixels, wherein (h)(iii) a first ore of the weighting factors which is related to a difference between a value of a particular pixel and a value of its neighboring pixel, is based on a distance between the particular pixel and the first one of the pixels, wherein the first one of the weighting factors is low if the distance between the particular pixel and the first one of the pixels is high and wherein (h)(iv) a second one of the weighting factors which is related to a difference between a value of a particular pixel and a value of its neighboring pixel, is based on the location of the neighboring pixel related to the particular pixel, wherein the second one of the weighting factors is high if the neighboring pixel is located above the particular pixel and is low if the neighboring pixel is located below the particular pixel; and assigning means for assigning a depth value corresponding to the first one of the pixels on basis of the computed cost value.

10. An image processing apparatus comprising:

receiving means for receiving a signal corresponding to an image; and a depth map generating unit for generating, from a single view input image, a depth map, wherein said depth map generating unit includes computing means for computing cost values as depth cues, wherein the cost values comprise respective measures of (i) a number of and (ii) extent of transitions in luminance and/or color and/or color components for pixels of the image on a path related to a spatial disposition of objects in the image, wherein said computing cost values as depth cues includes computing a cost value as a depth cue for a first one of the pixels of the image by (a) accumulating differences between luminance and/or color and/or color component values of (b) pairs of neighboring connected pixels, wherein each pair of neighboring connected pixels is distinct and located at separate transitions, wherein (c) the separate transitions are disposed on (d) the path, wherein the path comprises a group of connected pixels that extends from (e) the first one of the pixels to (f) a second one of the pixels, wherein the second one of the pixels belongs to (g) a predetermined subset of the pixels of the image, wherein the predetermined subset comprises one selected from the group consisting of (g)(i) pixels which are located at a border of the image, (g)(ii) pixels of a part of the border, and (g)(iii) a central pixel of the image further wherein the cost value for the first one of pixels is computed by (h) accumulating products of (h)(i) differences between the values of the pixels which are disposed on the path and (h)(ii) respective weighting factors for the differences, wherein the weighting factors control contributions of pixel; value differences for computation of depth values corresponding to respective pixels, wherein (h)(iii) a first one of the weighting factors which is related to a difference between a value of a particular pixel and a value of its neighboring pixel, is based on a distance between the particular pixel and the first one of the pixels, wherein the first one of the weighting factors is low if the distance between the particular pixel and the first one of the pixels is high and wherein (h)(iv) a second one of the weighting factors which is related to a difference between a value of a particular pixel and a value of its neighboring pixel, is based on the location of the neighboring pixel related to the particular pixel, wherein the second one of the weighting factors is high if the neighboring pixel is located above the particular pixel and is low if the neighboring pixel is located below the particular pixel, and assigning means for assigning a depth value corresponding to the first one of the pixels on basis of the computed cost value.

11. A non-transitory computer-readable medium comprising instructions stored thereon for execution by a computer to generate, from a single view input image, a depth map of depth values representing distances to a viewer, for respective pixels of the image, the computer comprising processing means and a memory, the computer-readable medium, after being loaded, providing said processing means with the capability to carry out:

computing cost values as depth cues, wherein the cost values comprise respective measures of (i) a number of and (ii) extent of transitions in luminance and/or color and/or color components for pixels of the image on a path related to a spatial disposition of objects in the image, wherein said computing cost values as depth cues includes computing a cost value as a depth cue for a first one of the pixels of the image by (a) accumulating differences between luminance and/or color and/or color component values of (b) pairs of neighboring connected pixels, wherein each pair of neighboring connected pixels is distinct and located at separate transitions, wherein (c) the separate transitions are disposed on (d) the path, wherein the path comprises a group of connected pixels that extends from (e) the first one of the pixels to (f) a second one of the pixels, wherein the second one of the pixels belongs to (g) a predetermined subset of the pixels of the image, wherein the predetermined subset comprises one selected from the group consisting of (g)(i) pixels which are located at a border of the image, (g)(ii) pixels of a part of the border, and (g)(iii) a central pixel of the image further wherein the cost value for the first one of pixels is computed by (h) accumulating products of (h)(i) differences between the values of the pixels which are disposed on the path and (h)(ii) respective weighting factors for the differences, wherein the weighting factors control contributions of pixel value differences for computation of depth values corresponding respective pixels, wherein (h)(iii) a first one of the weighting factors which is related to a difference between a value of a particular pixel and a value of its neighborinq pixel is based on a distance between the particular pixel and the first one of the pixels, wherein the first one of the weighting factors is low if the distance between the particular pixel and the first one of the pixels is high and wherein (h)(iv) a second one of the weighting factors which is related to a difference between a value of a particular pixel and a value of its neighboring pixel, is based on the location of the neighboring pixel related to the particular pixel, wherein the second one of the weighting factors is high if the neighboring pixel is located above the particular pixel and is low if the neighboring pixel is located below the particular pixel; and assigning a depth value corresponding to the first one of the pixels on basis of the computed cost value.

* * * * *